United States Patent [19]
Soon

[11] Patent Number: 6,052,914
[45] Date of Patent: Apr. 25, 2000

[54] ERROR PROOF MEASURING TAPE RULE

[76] Inventor: Min Tet Soon, P.O. Box A499, 89357 Inanam, Malaysia

[21] Appl. No.: 09/030,573

[22] Filed: Feb. 24, 1998

[51] Int. Cl.[7] ............................................. G01B 3/10
[52] U.S. Cl. ........................ 33/758; 33/755; 33/766; 33/770
[58] Field of Search .................... 33/755, 757, 758, 33/759, 760, 761, 766, 768, 770

[56] References Cited

U.S. PATENT DOCUMENTS

| | | | |
|---|---|---|---|
| 1,145,244 | 7/1915 | Hoffmann | 33/755 |
| 1,303,756 | 5/1919 | Ballou | 33/758 |
| 1,959,990 | 5/1934 | Summers | 33/763 |
| 3,131,480 | 5/1964 | Quenot | 33/770 |
| 3,205,584 | 9/1965 | Overaa | 33/760 |
| 3,745,663 | 7/1973 | Dodge . | |
| 4,186,490 | 2/1980 | Quenot | 33/762 |
| 4,300,289 | 11/1981 | DeHaven . | |
| 4,930,227 | 6/1990 | Ketchpel . | |
| 5,010,656 | 4/1991 | Broselow . | |
| 5,044,089 | 9/1991 | Petkovic et al. | 33/755 |
| 5,214,859 | 6/1993 | Buhler . | |
| 5,699,623 | 12/1997 | Lee | 33/758 |

FOREIGN PATENT DOCUMENTS

| | | | |
|---|---|---|---|
| 894774 | 4/1962 | United Kingdom | 33/755 |

*Primary Examiner*—Andrew H. Hirshfeld
*Attorney, Agent, or Firm*—Richard L. Miller, P.E.

[57] ABSTRACT

An error proof measuring tape rule for eliminating snagging on a work piece. The rule includes a tape rule, a hook affixed to the tape rule, and a one-piece spoon affixed to the tape rule. The upper surface of the body portion of the one-piece spoon is positioned on the lower surface of the free end of the tape rule, with the three throughbores in the body portion of the one-piece spoon aligned with three forwardmost throughbores of the four throughbores in the free end of the tape rule, and with the tail portion of the one-piece spoon extending upwardly through a rearmost throughbore of the four throughbores in the free end of the tape rule and rearwardly along the upper surface of the free end of the tape rule.

5 Claims, 1 Drawing Sheet

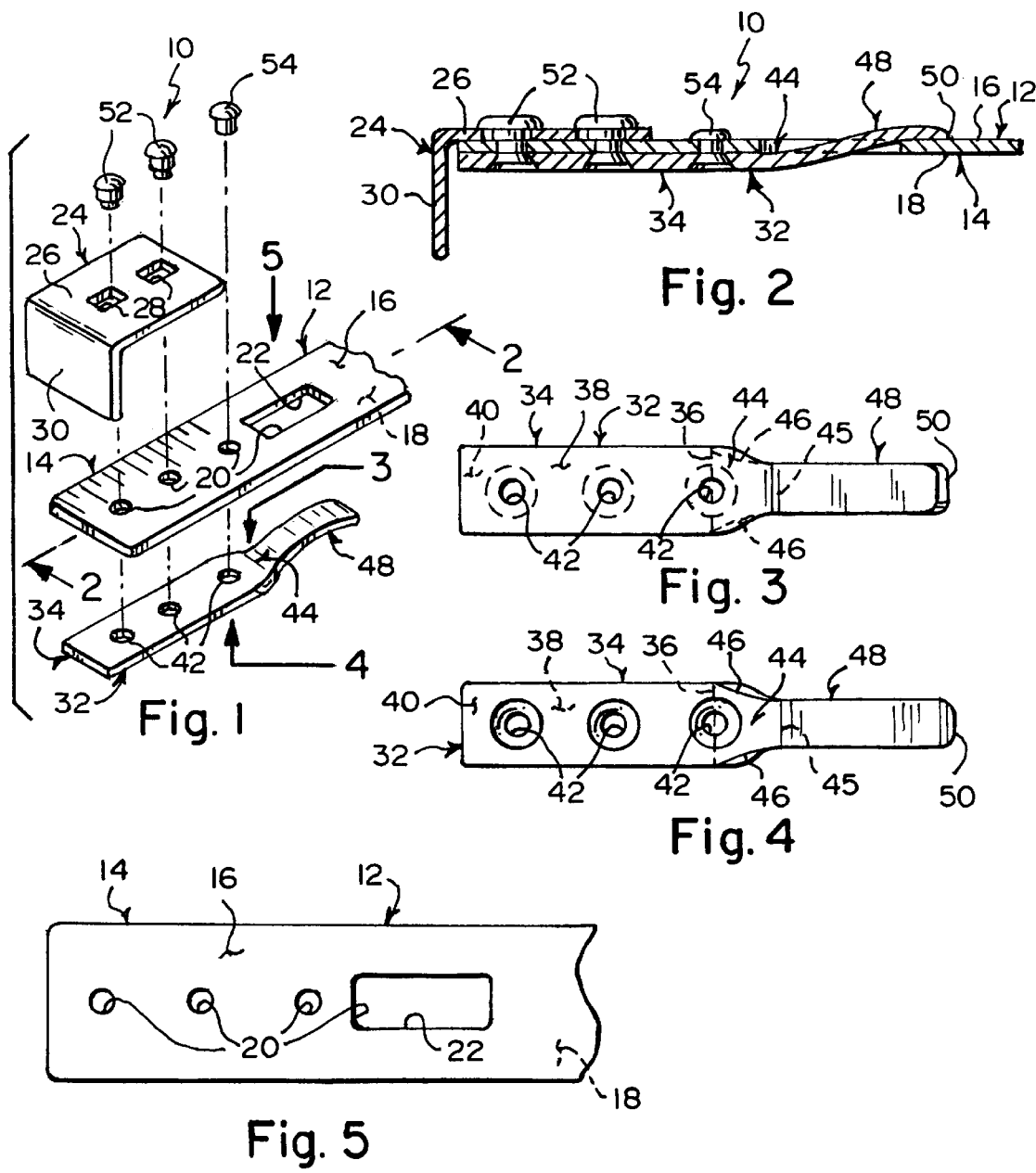

6,052,914

ERROR PROOF MEASURING TAPE RULE

BACKGROUND OF THE INVENTION

1. Field of the Invention

The present invention relates to a tape rule. More particularly, the present invention relates to an error proof measuring tape rule.

2. Description of the Prior Art

Tape rulers are widely used in engineering and construction fields. Millions of people use tape rules to do their measuring job everyday. Thousand of tape rule factories produce tape rules worldwide.

All the tape rules, however, contain the same defect; the end part of the tape rules are made with a hook to hook onto the job being measured that is either of the loose type or the fixed type and which is fitted on the steel tape with rivets. Some have a reinforced steel plate added.

When the tape rule is used to measure long section material like angle bars, hollow sections, or I beams, the tape rule always hooks on the rivet, not the hook, especially, material with sharp edges. This defect results in the work being cut shorter than the reading and appears on all the tape rules available on the market.

This defect is exemplified by putting a razor sharp knife 45 degrees slantingly, pulling the tape rule slowly towards the razor sharp knife; the tape rule will stop at the point of the rivet head, regardless how thin the rivet is made. This experiment tells us that all of the tape rules have the same defect.

When these types of tape rule are used to measure jobs, there is the risk of a measuring mistake; the user always has to approach the end of the material and check whether the hook is properly hooked at the end of the job being measured, which causes wasted time.

Numerous innovations for tape rules have been provided in the prior art that will be described. Even though these innovations may be suitable for the specific individual purposes to which they address, however, they differ from the present invention.

FOR EXAMPLE, U.S. Pat. No. 3,745,663 to Dodge teaches a measuring device comprising a conventional, metal measuring tape including a hook member adapted to be connected to the outer free end of the tape and having an arcuate shape corresponding with the shape of a cylindrical member which is to be measured. The hook member is located so that its center of curvature is aligned with the zero point of the tape. An arm assembly is carried on the tape housing for pivotal movement about the longitudinal axis of the tape. A surface of the arm is arranged to extend exactly perpendicular to the tape axis to serve as a measuring datum.

ANOTHER EXAMPLE, U.S. Pat. No. 4,300,289 to DeHaven teaches a hook end for attachment to the free end of a graduated measuring tape, especially adapted to replace a broken free end.

STILL ANOTHER EXAMPLE, U.S. Pat. No. 4,930,227 to Ketchpel teaches a spring powered coilable rule that has a coilable metal tape with a tape hook at the end thereof. The tape hook has an elongated body portion extending along the surface of the tape a length greater than the width of the tape and a depending leg portion which has an upper end dimensioned and configured to overlie the outer edge of the tape in its uncoiled state. The body portion tapers in width from the leg portion to a reduced width, and at least three rivets are spaced axially along the length of the body portion to secure the tape hook to the tape.

YET ANOTHER EXAMPLE, U.S. Pat. No. 5,010,656 to Broselow teaches an apparatus for therapeutic treatment of a patient. A measuring tape is used to measure the heel-to-crown height of a patient. The tape has coded zones along its effective length. A dispenser is provided with correspondingly coded zones whereby a treatment administered using the coding of the dispenser is correlated to the heel-to-crown height of a patient as measured by the tape.

FINALLY, STILL YET ANOTHER EXAMPLE, U.S. Pat. No. 5,214,859 to Buhler teaches that the leading end of a tape measure can be pushed over an uneven surface such as a shingled roof by coupling a sled or ski to the end of the tape. The sled has a smooth lower surface. A forward end of the sled is upraised to as to present a curved surface to obstacles. As the tape is pushed along the surface, the sled is pushed by the tape. The sled prevents the end of the tape from snagging on objects, by gliding over obstacles.

It is apparent that numerous innovations for tape rules have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an error proof measuring tape rule that avoids the disadvantages of the prior art.

ANOTHER OBJECT of the present invention is to provide an error proof measuring tape rule that is simple and inexpensive to manufacture.

STILL ANOTHER OBJECT of the present invention is to provide an error proof measuring tape rule that is simple to use.

BRIEFLY STATED, YET ANOTHER OBJECT of the present invention is to provide an error proof measuring tape rule for eliminating snagging on a work piece. The rule includes a tape rule, a hook affixed to the tape rule, and a one-piece spoon affixed to the tape rule. The upper surface of the body portion of the one-piece spoon is positioned on the lower surface of the free end of the tape rule, with the three throughbores in the body portion of the one-piece spoon aligned with three forwardmost throughbores of the four throughbores in the free end of the tape rule, and with the tail portion of the one-piece spoon extending upwardly through a rearmost throughbore of the four throughbores in the free end of the tape rule and rearwardly along the upper surface of the free end of the tape rule.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is an exploded diagrammatic perspective view of the present invention;

FIG. 2 is an enlarged cross sectional view taken on line 2—2 in FIG. 1;

FIG. 3 is an enlarged diagrammatic top plan view taken generally in the direction of arrow 3 in FIG. 1;

FIG. 4 is an enlarged diagrammatic bottom plan view taken generally in the direction of arrow 4 in FIG. 1; and FIG. 5 is an enlarged diagrammatic top plan view taken generally in the direction of arrow 5 in FIG. 1.

LIST OF REFERENCE NUMERALS UTILIZED IN THE DRAWING 10 error proof measuring tape rule of the present invention
12 tape rule
14 free end of tape rule 12
16 upper surface of free end 14 of tape rule 12
18 lower surface of free end 14 of tape rule 12
20 four throughbores in free end 14 of tape rule 12
22 innermost one of four throughbores 20 in free end 14 of tape rule 12
24 hook
26 horizontal portion of hook 24
28 pair of elongated throughbores in horizontal portion 26 of hook 24
30 vertical portion of hook 24
32 one-piece spoon
34 body portion of one-piece spoon 32
36 imaginary rear border of body portion 34 of one-piece spoon 32
38 upper surface of body portion 34 of one-piece spoon 32
40 lower surface of body portion 34 of one-piece spoon 32
42 three throughbores in body portion 34 of one-piece spoon 32
44 intermediate portion of one-piece spoon 32
45 imaginary rear border of intermediate portion 44 of one-piece spoon 32
46 exposed edges of intermediate portion 44 of one-piece spoon 32
48 tail portion of one-piece spoon 32
50 rear border of tail portion 48 of one-piece spoon 32
52 pair of rivets
54 single rivet

DETAILED DESCRIPTION OF THE PREFERRED EMBODIMENT

Referring now to the figures in which like numerals indicate like parts, and particularly to FIG. 1, the error proof measuring tape rule of the present invention is shown generally at 10.

As shown in FIGS. 1 and 5, the error proof measuring tape rule 10 comprises a tape rule 12 that has a free end 14 with an upper surface 16, a lower surface 18, and four throughbores 20 that extend vertically therethrough and which are spaced longitudinally therealong, with an innermost one 22 thereof being rectangular-shaped and extending longitudinally.

As shown in FIGS. 1 and 2, the error proof measuring tape rule 10 further comprises a hook 24 that has a horizontal portion 26 with a pair of elongated throughbores 28 that are spaced longitudinally therealong, and a vertical portion 30 that depends from the horizontal portion 26 of the hook 24.

The hook 24 is longitudinally slidably positioned on the free end 14 of the tape rule 12 so as to allow for inward and outward measuring, with the horizontal portion 26 of the hook 24 overlying the upper surface 16 of the free end 14 of the tape rule 12 to a distance between the second and third throughbores of the four throughbores 20 in the free end 14 of the tape rule 12, with the pair of elongated throughbores 28 in the horizontal portion 26 of the hook 24 being aligned with the forwardmost pair of throughbores of the four throughbores 20 in the free end 14 of the tape rule 12, and with the vertical portion 30 of the hook 24 overhanging dependingly the free end 14 of the tape rule 12.

As shown in FIGS. 1-4, the error proof measuring tape rule 10 further comprises a one-piece spoon 32 that has a body portion 34 that is slender, elongated, and generally rectangular-shaped, an imaginary rear border 36, an upper surface 38, a lower surface 40, and three throughbores 42 that are spaced longitudinally therealong and countersunk on the lower surface 40 of the body portion 34 of the one-piece spoon 32.

The one-piece spoon 32 further has an intermediate portion 44 that tapers longitudinally rearwardly from, and is coplanar with, the imaginary rear border 36 of the body portion 34 of the one-piece spoon 32 to an imaginary rear border 45 thereof, with its exposed edges 46 being upwardly chamfered so as to prevent snagging on a work piece.

The one-piece spoon 32 further has a tail portion 48 that is generally serpentine-shaped and extends upwardly and rearwardly from, and at the same width as, the imaginary rear border 45 of the intermediate portion 44 of the one-piece spoon 32 to a rear border 50 thereof that is chamfered so as to further prevent snagging on the work piece.

The upper surface 38 of the body portion 34 of the one-piece spoon 32 is positioned on the lower surface 18 of the free end 14 of the tape rule 12, with the three throughbores 42 in the body portion 34 of the one-piece spoon 32 aligned with the three forwardmost throughbores of the four throughbores 20 in the free end 14 of the tape rule 12, and with the tail portion 50 of the one-piece spoon 32 extending upwardly through the rearmost throughbore of the four throughbores 20 in the free end 14 of the tape rule 12 and rearwardly along the upper surface 16 of the free end 14 of the tape rule 12.

As shown in FIGS. 1 and 2, the hook 24 and the one-piece spoon 32 are maintained at their positions relative to the free end 14 of the tape rule 12 by a pair of rivets 52 that pass through the pair of elongated throughbores 28 in the horizontal portion 26 of the hook 24, through the forwardmost pair of throughbores of the four throughbores 20 in the free end 14 of the tape rule 12, and through the forwardmost pair of throughbores 42 in the body portion 34 of the spoon 32 where they are mashed and disposed in the countersinks, and by a single rivet 54 that passes through the third rearward throughbore of the four throughbores 20 in the free end 14 of the tape rule 12, and through the third throughbore of the three throughbores 42 in the body portion 34 of the spoon 32 where it is mashed and disposed in the countersink.

It will be understood that each of the elements described above, or two or more together, may also find a useful application in other types of constructions differing from the types described above.

While the invention has been illustrated and described as embodied in an error proof measuring tape rule, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An error proof measuring tape rule comprising:

a) a tape rule; said tape rule having a free end with an upper surface, a lower surface, and four throughbores extending vertically therethrough and being spaced longitudinally therealong, with an innermost one thereof being rectangular-shaped and extending longitudinally;

b) a hook longitudinally slidably positioned on said free end of said tape rule so as to allow for inward and outward measuring; said hook having a horizontal portion with a pair of elongated throughbores that are spaced longitudinally therealong, and a vertical portion that depends from said horizontal portion of said hook; said horizontal portion of said hook overlaying said upper surface of said free end of said tape rule to a distance between the second and third throughbores of said four throughbores in said free end of said tape rule, with said pair of elongated throughbores in said horizontal portion of said hook being aligned with a forwardmost pair of throughbores of said four throughbores in said free end of said tape rule; and c) a one-piece spoon having a body portion that is slender, elongated, and generally rectangular-shaped, an imaginary rear border, an upper surface, a lower surface, and three throughbores spaced longitudinally therealong; said upper surface of said spoon being positioned on said lower surface of said free end of said tape rule, with said three throughbores in said body portion of said spoon aligned with three forwardmost throughbores of said four throughbores in said free end of said tape rule, said spoon having an intermediate portion extending from the rear border of the body portion, and a tail portion extending from an imaginary rear border of the intermediate portion, said tail portion being generally serpentine-shaped in longitudinal profile and generally rectangular-shaped in plan, said tail portion of said spoon extending upwardly through said innermost throughbore of said four throughbores in said free end of said tape rule and rearwardly along said upper surface of said free end of said tape rule.

2. The error proof measuring tape rule as defined in claim 1, wherein said three throughbores in said spoon are countersunk on said lower surface of said body portion of said spoon.

3. The error proof measuring tape rule as defined in claim 2, wherein said intermediate portion tapers longitudinally rearwardly from, and is coplanar with, said imaginary read border of said body portion of said one-piece spoon, with its exposed edges being upwardly chamfered so as to prevent snagging on a work piece.

4. The error proof measuring tape rule as defined in claim 3, wherein said tail portion extends upwardly and rearwardly from, and at same width as, said imaginary rear border of said tapered intermediate portion of said one-piece spoon to a rear border thereof that is chamfered so as to further prevent snagging on the work piece.

5. The error proof measuring tape rule as defined in claim 3, wherein said hook and said one-piece spoon are maintained at their positions relative to said free end of said tape rule by a pair of rivets that pass through said pair of elongated throughbores in said horizontal portion of said hook, through said forwardmost pair of throughbores of said four throughbores in said free end of said tape rule, and through a forwardmost pair of throughbores in said body portion of said spoon where they are mashed and disposed in said respective countersinks, and by a single rivet that passes through said third throughbore of said four throughbores in said free end of said tape rule and through the third throughbore of said three throughbores in said body portion of said spoon where it is mashed and disposed in said respective countersink.

* * * * *